Patented July 9, 1946

2,403,876

UNITED STATES PATENT OFFICE 2,403,876

GLYCOL ESTERS AND METHOD OF PRODUCING SAME

Friedrich F. Nord, Bronx, N. Y.

No Drawing. Application January 22, 1943, Serial No. 473,261

14 Claims. (Cl. 260—488)

This invention relates to new glycol esters and also to a method of making the same.

More particularly, the present invention is directed to the formation of glycol esters by condensation of aldehydes in the presence of a catalyst. It has been known for a number of years that an aldehyde or a mixture of aldehydes may be caused to react in the presence of a catalyst, such as magnesium alkoxide, to cause condensation of two molecules of the aldehyde or one molecule each of two aldehydes. The products of such reactions were simple esters. Various catalysts of this type were used and substantial conversions were obtained.

The present invention is intended and adapted to provide a process for causing condensation of aldehydes whereby not simple esters are formed, but glycol esters. The condensation according to the present invention is intended to take place not between two molecules of aldehyde but between three molecules, whereby the condensation is trimeric in character. The starting materials may be saturated or unsaturated aldehydes or mixtures thereof.

In accordance with the present invention, the aldehyde or mixture of aldehydes is caused to condense in the presence of a complex coordination compound of the magnesium-aluminum-alkoxide type. The reaction probably takes place in two stages, in the first of which two molecules of an aldehyde or one molecule each of two aldehydes are caused to react by condensation whereby an aldol is formed. The second stage of the reaction is the condensation of the aldol with a third molecule of aldehyde whereby an ester is formed, said ester being of the glycol type.

The catalyst used is of essential importance, and it is believed that the complex coordination compound employed has a double function. The magnesium element of the catalyst is basic and it favors the first stage of the reaction, namely, the production of the aldol. The aluminum element is less basic than the magnesium and it is believed that this favors esterification. The complex compound used apparently retains the properties of each of the elements and allows the reaction to go in the desired order and in the desired direction.

Various aldehydes may be used in the present reaction, it being important that the aldehydes be open chain compounds. The best reaction, with the highest efficiency takes place with those aldehydes in which there is a $CH_2$ group in alpha position to the aldehyde group. It is also important that the aldehydes be straight chain compounds, as such starting materials have been found to give excellent yields of glycol esters and they do not require special precautions in order to obtain high yields. It is also important that the temperature of the reaction be relatively low and, generally, the lower the temperature, the higher is the efficiency of the reaction.

In practicing the present invention the procedure to be followed is relatively simple. The aldehyde is placed in a suitable vessel with the catalyst, the mixture is preferably stirred, and as the temperature tends to rise, cooling is effected. After a suitable length of time, usually several hours, the reaction may be considered as complete and since the reaction is one of equilibrium, the resulting glycol esters are in solution in excess of aldehyde. There may also be present a relatively small amount of side reaction products, such as dehydration products of the intermediate aldols. In order to obtain the glycol esters in relatively pure form, the reacted mass is subjected to a distillation operation at a low temperature and in the presence of a relatively high vacuum. Ordinarily, the distillation takes place at not over 40–50° C. and the pressures may be as low as a very few millimeters of mercury. By such a simple fractional distillation, a relatively pure product is obtained and the residual aldehyde may again be used for further operations. Therefore, the reaction is extremely efficient even though the yield in any one operation may not be extremely high.

The reactions may be exemplified by the following equations:

$$2RCHO \rightarrow RCHOHR'CHO \qquad (1)$$
$$RCHO + RCHOHR'CHO \rightarrow$$
$$RCHOHR'CH_2OCOCH_2R \qquad (2)$$

wherein R is a group taken from the class consisting of saturated and unsaturated hydrocarbon groups and hydrogen. R' is group R minus a hydrogen atom.

The invention is illustrated by the following specific examples:

*Example I*

A mixture is made of 64 parts by weight of propionaldehyde and 2.5 parts by weight of magnesium-aluminum-propoxide. The temperature of the reaction mixture tends to rise and it is subjected to periodic cooling so as to reduce the temperature to approximately room temperature. If the rise in temperature is too great, artificial cooling may be adopted to reduce the temperaroom temperatures. The reaction takes place in two stages, the first being a combination of two molecules of propionaldehyde to form the corresponding aldol, in accordance with the following equation:

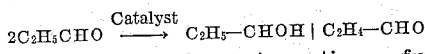

Simultaneously with the first reaction, a further condensation takes place with a third molecule of propionaldehyde to form the final glycol ester, in accordance with the following equation:

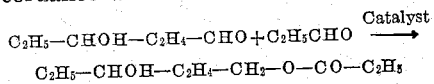

This type reaction is entirely unexpected from the previous reactions carried out with aldehydes and alkoxide catalysts. Ordinarily, according to prior knowledge, the reaction takes place between two molecules of aldehyde and there is a dehydration of the aldol formed in the reaction. It appears that in the present reaction, due to the type of catalyst used, the aldol is stabilized by the second reaction which takes place, apparently, almost simultaneously with the formation of aldol and at a greater rate than the dehydration. This is probably due to the strong esterifying influence of the coordination catalyst. As a result, very little or no dehydration product is formed during the reaction.

*Example II*

A mixture is made of 70 parts by weight of crotonaldehyde and 72 parts by weight of butyraldehyde. To this mixture is added 7 grams of magnesium-aluminum-ethoxide. The mixture is allowed to stand at ordinary temperatures, with stirring at intervals, and with cooling as the temperature tends to rise. The reaction takes place in two stages, in the first of which one molecule each of crotonaldehyde and butyraldehyde are condensed to form the aldol, the accordance with the following reaction:

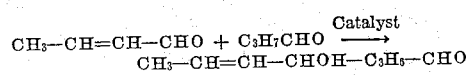

The reaction further proceeds between a second molecule of butyraldehyde and the aldol, in accordance with the following reaction, to form the glycol ester:

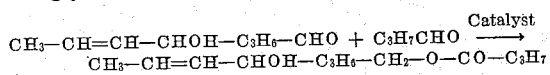

From the reaction mixture, the glycol ester may be isolated, as stated above, by fractional vacuum distillation. The product may be subjected to hydrogenation in the presence of a suitable hydrogenation catalyst under conditions well established, whereby the double bond is saturated with hydrogen and a completely saturated glycol ester thus produced. Thus, the reaction of the saturated and unsaturated aldehydes is in the ratio of 2:1.

In the course of the reactions, spontaneous warming begins immediately upon adding the catalyst and the temperature rose rapidly. Therefore, the reaction mixtures are cooled from time to time by running tap water. The rise in temperature usually ceases within an hour and the reaction vessel is allowed to stand overnight. During the condensation the contents attains a color, varying from yellowish to greenish amber to amber red, depending upon the nature of the reactants. In most cases a fluorescence occurs.

The complex catalysts go into solution readily. The completion of the reaction is indicated upon shaking of the reaction mixture, whereupon a foam forms on the surface of the liquid, which lasts several minutes.

The glycol ester fractions obtained by the vacuum distillations are subjected to a purification treatment by the addition of a dilute solution of potassium carbonate and taken up with ether. The ethereal layer is dried with sodium sulphate, evaporated off, and the remainder slowly rectified.

While I have above described the production of two compounds by trimeric condensation, these examples are intended to illustrate the invention and not to limit the same. Various other aldehydes or mixtures of aldehydes may be similarly condensed, as for example, acetaldehyde, valeraldehyde, isovaleraldehyde, hexaldehyde, alpha - ethyl - butyraldehyde, heptaldehyde, and many others. The catalysts may vary and other complex coordination compounds of aluminum and magnesium of the alkoxy type, such as the butyroxide, may be used. The efficiency of conversion of the aldehyde to the glycol ester varies with conditions, but yields up to 65% have been readily obtained. However, this does not measure the over-all efficiency, as the bulk of the unreacted material may be re-used, whereby overall efficiencies of 95% or better are easily obtainable.

The substances of the present invention are adapted for many uses. For example, some of the compounds may be adapted as plasticizers in various resinous and similar compounds. Also, certain of the glycols which may be produced by hydrolysis of the esters have been found to be useful as repellents for mosquitoes and like insects. Various other uses of the present substances include insecticides. Also, the esters may be treated by first saponifying the same to produce the glycol and dehydrating the glycol removing two molecules of water to form butadiene and similar unsaturated substances useful for the manufacture of synthetic rubber and other substances.

What I claim is:

1. A method of producing glycol esters which comprises mixing an aliphatic aldehyde with a complex coordination catalyst of magnesium-aluminum-alkoxide, allowing the mixture to stand until a reaction takes place causing three molecules of aldehyde to react to form a glycol ester.

2. A method of producing glycol esters which comprises mixing two aliphatic aldehydes with a complex coordination catalyst of magnesium-aluminum-alkoxide, allowing the mixture to stand until a reaction takes place causing one molecule of one of said aldehydes and two molecules of the other aldehyde to react to form a glycol ester.

3. A method of producing glycol esters which comprises mixing two aliphatic aldehydes, one of which is staturated and the other is unsaturated, with a complex coordination catalyst of magnesium - aluminum - alkoxide, allowing the mixture to stand until a reaction takes place causing one molecule of one of said aldehydes and two molecules of the other aldehyde to react to form a glycol ester.

4. A method of producing glycol esters which comprises mixing two aliphatic aldehydes, one of which is saturated and the other is unsaturated in approximately equal parts, with a complex coordination catalyst of magnesium-aluminum-alkoxide, allowing the mixture to stand until a reaction takes place causing two molecules of the saturated aldehyde and one molecule of the unsaturated aldehyde to react to form a glycol ester.

5. A method of producing glycol esters which comprises mixing an aliphatic aldehyde with a complex coordination catalyst of magnesium-aluminium-alkoxide, allowing the mixture to stand until a reaction takes place causing three molecules of aldehyde to react to form a glycol ester, and isolating said ester by vacuum distillation.

6. A method of producing glycol esters which comprises mixing an aliphatic aldehyde with a complex coordination catalyst of magnesium-aluminum-alkoxide, the amount of said catalyst being about 5% by weight of said aldehyde, allowing the mixture to stand until a reaction takes place causing three molecules of aldehyde to react to form a glycol ester.

7. A method of producing glycol esters which comprises mixing an aliphatic aldehyde with a complex coordination catalyst of magnesium-aluminum-alkoxide, the aldehyde having from 2 to 7 carbon atoms, allowing the mixture to stand until a reaction takes place causing three molecules of aldehyde to react to form a glycol ester.

8. A method of producing glycol esters which comprises mixing an aliphatic aldehyde with a complex coordination catalyst of magnesium-aluminum-alkoxide, in an anhydrous medium, allowing the mixture to stand until a reaction takes place causing three molecules of aldehyde to react to form a glycol ester.

9. A method of producing glycol esters which comprises mixing an aliphatic aldehyde with a complex coordination catalyst of magnesium-aluminum-alkoxide, allowing the mixture to stand at room temperatures, until a reaction takes place causing three molecules of aldehyde to react to form a glycol ester.

10. A method of producing glycol esters which comprises mixing an aliphatic aldehyde having an alpha-$CH_2$ group with a complex coordination catalyst of magnesium-aluminum-alkoxide, allowing the mixture to stand until a reaction takes place causing three molecules of aldehyde to react to form a glycol ester.

11. Glycol esters which are condensation products of a mixture of saturated and unsaturated aliphatic aldehydes, one molecule of one of said aldehydes and two molecules of the other said aldehydes being combined in one molecule of said ester, said ester having the following structural formula:

$$R-CH=CH-CHOH-R'-CH_2-O-CO-R''$$

wherein R, R' and R'' are aliphatic hydrocarbon groups.

12. Glycol esters which are condensation products of a mixture of saturated and unsaturated aliphatic aldehydes, two molecules of saturated and one of unsaturated aldehyde being combined in one molecule of said ester, said ester having the following structural formula:

$$R-CH=CH-CHOH-R'-CH_2-O-CO-R''$$

wherein R, R' and R'' are aliphatic hydrocarbon groups.

13. Glycol esters which are condensation products of a mixture of saturated and unsaturated aliphatic aldehydes, one molecule of one of said aldehydes and two molecules of the other said aldehydes being combined in one molecule of said ester, the aldehydes having from 2 to 7 carbon atoms, said ester having the following structural formula:

$$R-CH=CH-CHOH-R'-CH_2-O-CO-R''$$

wherein R, R' and R'' are aliphatic hydrocarbon groups.

14. A method of producing glycol esters which comprises mixing an aliphatic aldehyde with a complex coordination catalyst of magnesium-aluminum-alkoxide, allowing the mixture to stand until a reaction takes place causing three molecules of aldehyde to react to form a glycol ester having the following general formula:

$$RCHOHR'CH_2OCOCH_2R$$

wherein R is a group taken from the class consisting of saturated and unsaturated aliphatic hydrocarbon groups and hydrogen, R' is a group taken from the class consisting of saturated and unsaturated aliphatic hydrocarbon groups.

FRIEDRICH F. NORD.